United States Patent [19]

Dreher

[11] Patent Number: 4,562,684
[45] Date of Patent: Jan. 7, 1986

[54] APPARATUS FOR APPLYING A TUBULAR MEMBER OVER A CONTAINER

[75] Inventor: Hans C. Dreher, Dallas, Pa.

[73] Assignee: Culbro Corporation, New York, N.Y.

[21] Appl. No.: 520,245

[22] Filed: Aug. 4, 1983

[51] Int. Cl.[4] .......................... B67B 5/03; B65B 57/00; B65B 53/02

[52] U.S. Cl. ......................................... 53/64; 53/292; 53/296; 53/314; 29/775

[58] Field of Search ...................... 53/52, 64, 290, 291, 53/292, 293, 294, 295, 296, 313, 314, 397, 399; 29/775; 156/86, 443, 475

[56] References Cited

U.S. PATENT DOCUMENTS

| | | | |
|---|---|---|---|
| 1,875,110 | 8/1932 | Myers | 29/775 |
| 1,962,481 | 6/1934 | Clark | 53/292 X |
| 2,053,763 | 9/1936 | Brinton | 53/313 X |
| 2,787,104 | 4/1957 | Carter | 53/292 |
| 3,029,499 | 4/1962 | Eddison et al. | 29/775 |
| 3,267,566 | 8/1966 | Ouellette | 29/775 |
| 3,324,537 | 6/1967 | Carter et al. | 29/775 |
| 3,340,591 | 9/1967 | Fisher et al. | 29/775 |
| 3,360,843 | 1/1968 | Pearson | 29/775 |
| 3,694,999 | 10/1972 | Switliski et al. | 53/313 |
| 3,711,961 | 1/1973 | Spiegel et al. | 53/557 X |
| 3,767,496 | 10/1973 | Amberg et al. | 156/86 |
| 3,768,136 | 10/1973 | Graham et al. | 29/775 |
| 3,802,942 | 4/1974 | Amberg et al. | 156/86 X |
| 3,852,940 | 12/1974 | Kinoshita | 53/292 |
| 3,861,118 | 1/1975 | Muto | 53/292 X |
| 3,959,065 | 5/1976 | Ashcroft | 156/86 X |
| 4,144,631 | 3/1979 | Fujio | 156/86 X |
| 4,148,171 | 4/1979 | Westlund | 53/291 X |
| 4,179,863 | 12/1979 | Fresnel | 53/297 X |
| 4,215,460 | 8/1980 | Amberg et al. | 264/230 X |
| 4,287,700 | 9/1981 | Fujio | 53/292 |
| 4,293,364 | 10/1981 | Fujio | 53/292 X |
| 4,318,685 | 3/1982 | Konstantin | 53/557 X |
| 4,357,788 | 11/1982 | Amberg | 53/292 X |

*Primary Examiner*—Robert L. Spruill
*Assistant Examiner*—Michael D. Folkerts
*Attorney, Agent, or Firm*—Morgan, Finnegan, Pine, Foley & Lee

[57] ABSTRACT

An apparatus for applying a tubular member over an article includes a supply of individual tubular members. A pair of opposed gripping members that are movable towards and away from each other are disposed on a rotatable pick-up and deposit wheel. As the wheel rotates, the gripping members come together to mechanically grip a tubular member from the supply. A vacuum is connected to the gripping members after they have mechanically gripped the tubular member, and the gripping members are moved apart as the wheel rotates them towards the application station so as to open the tubular member. The article is conveyed to the application station at a speed greater than that of the tubular member such that at the application station, the article meets the tubular member, is threaded therein, and pulls it fully open and around the article by a camming action. The vacuum is then disconnected so that the tubular member rests loosely around the container for further processing such as heat shrinking.

5 Claims, 10 Drawing Figures

APPARATUS FOR APPLYING A TUBULAR MEMBER OVER A CONTAINER

BACKGROUND OF THE INVENTION

1. Field of the Invention

This invention relates to an apparatus and method for applying a tubular member over a container, and is particularly adaptable for use in applying heat shrinkable seals to container tops so as to render the containers tamper resistant.

2. The Prior Art

In many industries, particularly the pharmaceutical industry, it is desirable to provide for the cap sealing of product containers for reasons of safety, tamper-proofing, sanitation, etc. Several known apparatus exist for effecting such desired cap sealing. Typically, such apparatus include a supply of flattened tubular heat shrinkable members, a pick-up mechanism, means for opening the tubular members, means for delivering the opened tubular members to an application station, means for applying the opened tubular members to containers as they are conveyed past the application station, and means for heating the tubular members so that they shrink around and conform to the shape of the containers thus sealing the containers. The tubular material is generally supplied to the apparatus by loading pre-cut individual members into a hopper or by employing a continuous web of flattened tubular material that is cut into individual members.

Unfortunately, however, there are shortcomings associated with such apparatus. For example, known apparatus generally employ a pick-up mechanism that relies on vacuum means, such as vacuum cups or the like, to pick up the tubular members from the supply source. Such reliance on a vacuum pick-up generally limits the speed at which the pick-up mechanism can operate, there being required a sufficient time delay for an adequate vacuum to be generated so as to enable the vacuum means to fully suck and firmly hold the tubular members from the supply source. As a result, many known apparatus must operate at an undesirable slow speed or with a stop-start intermittent motion.

Another shortcoming associated with known apparatus is that they tend to be quite complicated in structure, thus undesirably raising the cost of manufacturing and maintaining such apparatus. For example, several known apparatus employ multiple turrets for picking up the tubular members and delivering them to the application station, along with complicated mechanisms for effecting the opening of the tubular members and the pushing down of the tubular members onto the containers to be sealed.

A further shortcoming associated with known apparatus, particularly those employing a supply roll of tubular material, is that such apparatus, at times, cut and apply inconsistently dimensioned tubular members to containers. This can cause ineffective cap sealing when, for example, the tubular members are cut too short, or difficulty in opening the containers when the tubular members are cut too long. It also gives the sealed containers an unsightly appearance. Such inconsistencies may be attributable to the fact that the drive means, e.g. the motor, that effects the feed of the tubular web to the apparatus cutter generally also effects the drawing of the web from the supply roll. It will be appreciated that a motor powerful enough to draw a web from a fully loaded supply roll cannot be as sensitive as desired for feeding a precise length of material for cutting.

Still another shortcoming associated with known apparatus is that they often fail to sufficiently open the tubular members resulting in the misapplication of the members to the container.

It is an object of this invention to provide an apparatus and method for applying tubular members to containers that employs a pick-up mechanism that mechanically grips the tubular members from the supply source, opens the tubular members, and delivers the tubular members to an application station, in a continuous, high-speed, non-stop manner.

It is another object of this invention to provide an apparatus and method as above that insures the accurate application of consistently dimensioned tubular members to containers.

It is a further object of this invention to provide an apparatus as above that is simple in construction.

SUMMARY OF THE INVENTION

In accordance with the above recited objectives, the apparatus of the invention includes supply means for providing a continuous web of flattened tubular material. A first pair of feed rollers is selectively operable for drawing a portion of the web so as to periodically create a slack reservoir of tubular material. Preferably, the rollers draw the web around a pyramid shaped wedge member that effects the opening and cross-folding of the tubular material along lines disposed 90° from the original fold lines of the web. A second pair of feed rollers feeds a predetermined amount of the web from the reservoir of tubular material to a cutter that cuts individual tubular members of predetermined size from the web, the individual tubular members having opposed flattened side portions.

A rotatable pick-up and deposit wheel is disposed adjacent to the cutter for mechanically gripping the opposed flattened side portions of each tubular member after it is cut, transporting the tubular member in an arcuate path towards the container to which the tubular member is to be applied, and opening the tubular member as it is being transported toward the container. The pick-up and deposit wheel includes at least one pair of opposed gripping members that are movable towards and away from each other so that the gripping members come together to grip the individual tubular members as they are cut, and move away from each other as the tubular members are delivered towards the application station. Vacuum means associated with the gripping members selectively applies suction to the opposed flattened sides of each tubular member after the member has been mechanically gripped, thus effecting the opening of the tubular members as the gripping members move apart from one another. The vacuum in each pair of gripping members is terminated as the gripping members reach the application station so as to release the tubular members at that point.

The apparatus further includes means for conveying the containers to which the tubular members are to be applied to the application station at a speed greater than that of the tubular members along their arcuate path to the application station such that as each container passes the application station the container contacts the opened tubular member, pulls the member and fully opens the tubular member so that the tubular member is accurately deposited over the container.

DETAILED DESCRIPTION OF THE PREFERRED EMBODIMENTS

Referring to FIGS. 1, 2, 2a and 9, the apparatus of the invention is designated generally by reference numeral 10. As illustrated, the apparatus employs a supply roll 11 that carries a continuous web of flattened, heat-shrinkable tubular material 12 from which individual tubular sealing sleeves or bands 5 are formed. The web 12 is fed through two pairs of rollers 13 and 14 and 16 and 17 and around a cross-folding member 15 disposed between said two pairs of rollers. As illustrated, cross-folding member 15 comprises a triangular wedge-shaped member disposed within web 12 which effects the opening and cross-folding of the flattened web 2 along fold lines disposed 90° from the original fold lines of the web. The cross-folded web 12 then passes between a roller 18 and a flattening member 19 that is biased against roller 18 so that edge portion 19a of flattening member 19 flattens the cross-folded web along its old fold lines which, after the cross-folding, are disposed along the center of the web. The purpose of cross-folding the web is to make the web more susceptible to opening as will be described in more detail below.

Figures 2, 2A:
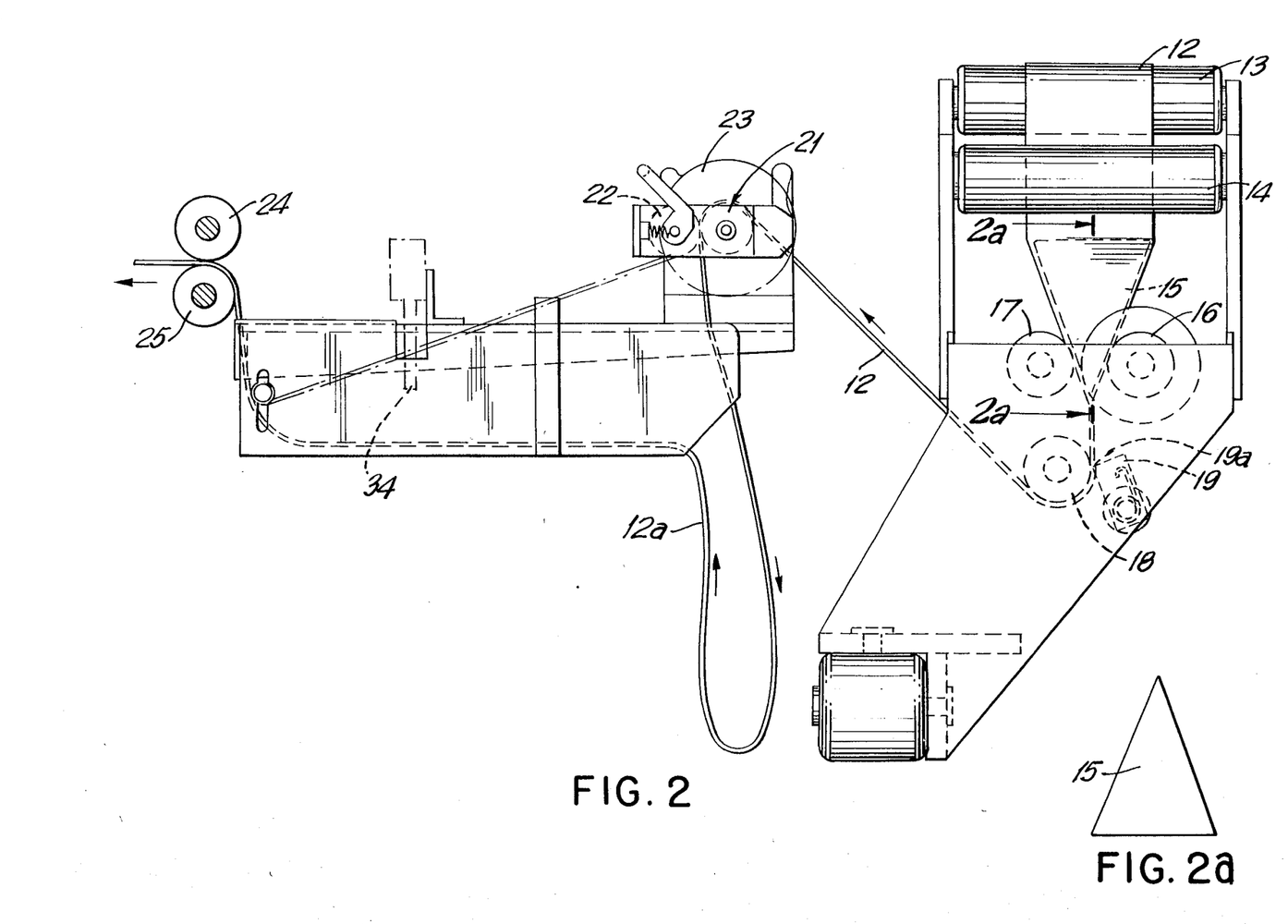
FIG. 2 is a schematic of the cross-folding and reservoir creating mechanisms of the apparatus.
FIG. 2a is a cross-sectional view of the cross-folding wedge member of the apparatus taken along lines 2a—2a of FIG. 2.

The cross-folded web 12 is then fed between a pair of powered nip rollers 21 and 22 which are selectively operable by a switch 34 and motor 23 to draw the web material from supply roll 11 so as to periodically create a slack portion or reservoir of web material 12a.

Figure 3:
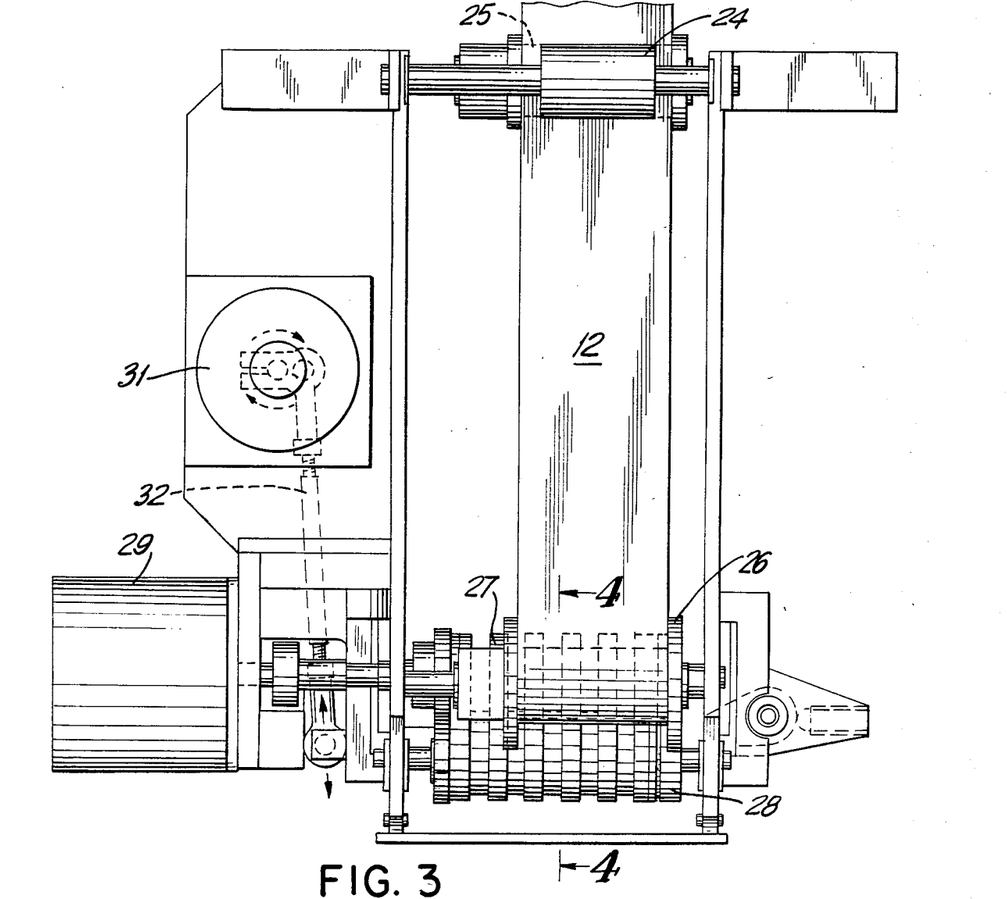
FIG. 3 is a partial plan view of the cutting and feed means of the apparatus.
Figure 4:
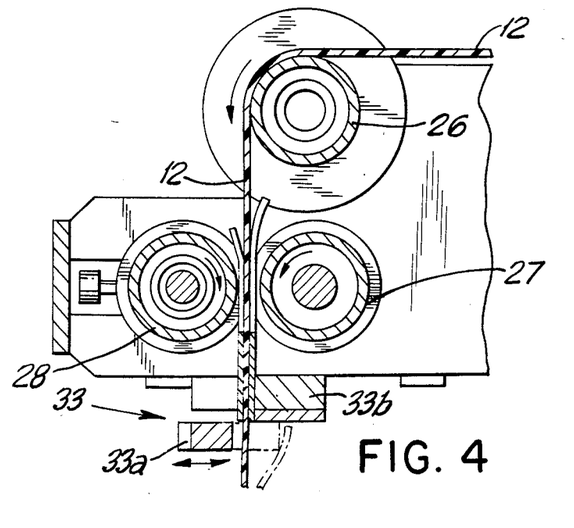
FIG. 4 is a cross-sectional view taken along lines 4—4 of FIG. 3.

Referring to FIGS. 2, 3 and 4, web 12 is then fed through guide rollers 24, 25 and 26 to a pair of feed rollers 27 and 28. As illustrated, feed roller 27 is driven by a motor 29, preferably a numerical control stepper motor, that is programmed to provide a precise length of web material to a cutter 33. Specifically, motor 29 can be programmed to give a predetermined number of "steps", with each "step" rotating feed roller 27 and, along with it, feed roller 28 a specific amount such that the precise amount of web material is fed. It will be noted that as feed rollers 27 and 28 draw web material from the reservoir portion 12a the web becomes increasingly taut until such time as the web comes into contact with switch 34. Switch 34 operates motor 23 and nip rollers 21 and 22 for a predetermined period of time so as to draw additional web material from supply roll 11 and create a new reservoir of web material. Preferably a brake member 8 is biased against supply roll 11 to prevent any overspill of the web material as it is being drawn by rollers 21 and 22.

As shown in FIGS. 3 and 4, cutter 33 may comprise a movable portion 33a that cuts the web 12 against a stationary portion 33b of the cutter. The reciprocal movement of movable cutter portion 33a is effected by the periodic rotation of a cutter motor 31 and the attendant reciprocal motion of a crank connecting member 32 that is connected between motor 31 and movable cutter portion 33a. Preferably, cutter motor 31 is also a stepper motor that, upon completion of each cycle of "steps" by feed motor 29, rotates 360° to effect the movement of movable cutter portion 33a to and from cutter stationary portion 33b. It is also preferable that a spring member 36 be connected to the unsupported end of movable cutter portion 33a to provide it with sufficient tension to insure good cutting (See FIG. 5).

Turning now to FIGS. 1 and 5–8, the apparatus 10 further includes a rotatable pick-up and deposit wheel 40 that is disposed adjacent to cutter 33, between cutter 33 and a conveyor means 70, the area between conveyor means 70 and wheel 40 comprising an application station. As illustrated, conveyor means 70 comprises a conveyor belt 71 and a timing screw 72 which convey a plurality of containers 6 towards the application station.

In accordance with the invention, pick-up and deposit wheel 40 includes at least one pair of reciprocably movable gripping members 41. As shown best in FIGS. 6–8, each gripping member 41 comprises a body portion 42, a head portion 43, an anti-rotational shaft portion 44 slidably disposed within body portion 42, and a connector member 45 that connects shaft portion 44 with head portion 43. Preferably, each head 43 includes a tip portion 38 having a plurality of vacuum ports 39. Tip portions 38 may be formed from rubber or a similar friction forming material.

Figures 7, 8:
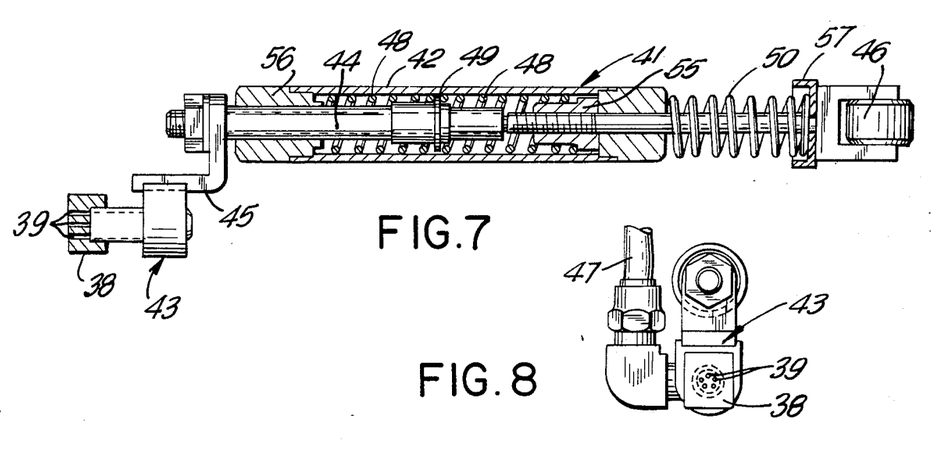
FIG. 7 is a cross-sectional view of one of the gripping members of the pick-up and deposit wheel of the apparatus.
FIG. 8 is a frontal view of the head portion of one of the gripping members of the pick-up and deposit wheel of the apparatus.

Referring in particular to FIG. 7, gripper members 41 are shown to further comprise spring members 48 disposed within body portion 42 and around shaft member 44, each spring member 48 being disposed on opposite sides of a spring engagement member 49, and spring stop members 55 and 56. A cam follower 46 is disposed at the end of anti-rotational shaft member 44 opposite the end thereof connected to head portion 43, and it is preferable that an additional spring member 50 be disposed around each gripping member 41 between wheel 40 and a stop member 57 that is connected to each cam follower 46. Spring members 48 and 50 bias shaft member 44 and, attendant therewith, cam follower 46 against an associated circular cam member 62 of varying depth. Cam 62 is fixedly disposed behind pick-up and deposit wheel 40. As will be described in more detail below, the rotation of wheel 40 and the attendant tracking of each cam follower 46 with its respective cam 62 effects the reciprocal movement of each gripping head portion 43 for gripping, opening and releasing each of the tubular members 5 over a container 6.

Vacuum means is associated with each of the gripping member head portions 43 for selectively applying suction thereto. For this purpose, a vacuum hose 47 is connected to each gripping member head portion 43 at one end and to a connector 51 at its other end, each connector 51 communicating with a stationary vacuum valve 52 disposed behind pick-up and deposit wheel 40.

Figure 5:
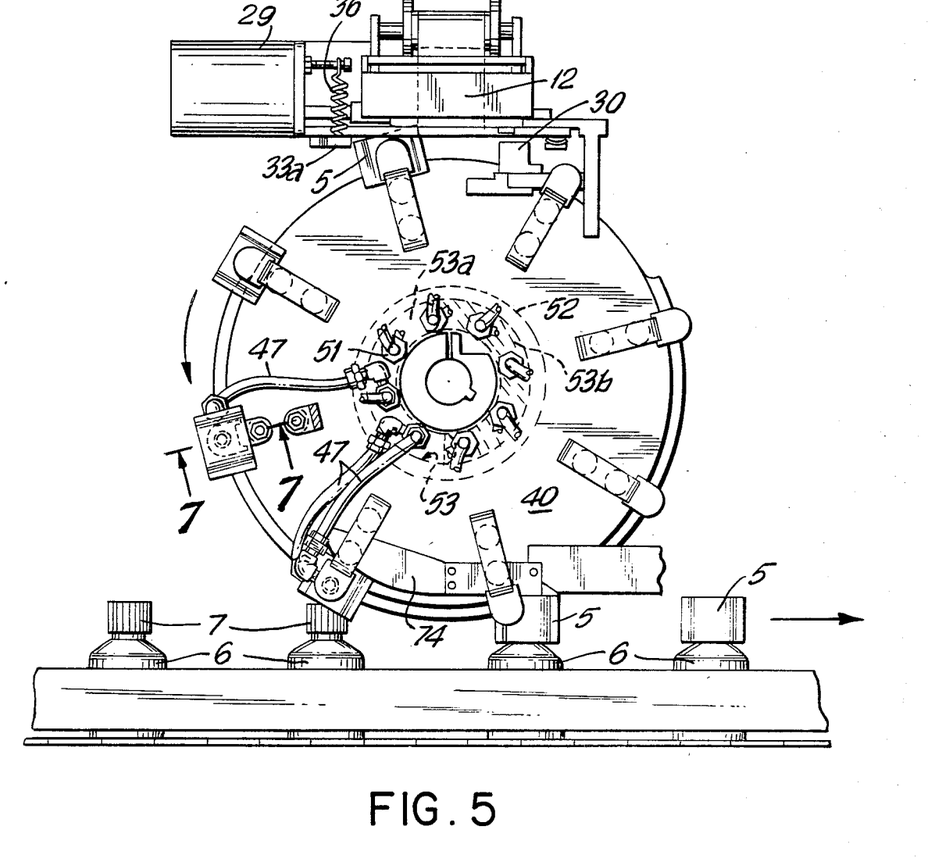
FIG. 5 is an elevational schematic of the pick-up and deposit wheel of the apparatus.

Vacuum valve 52 preferably includes a circular slot portion 53 that communicates with a vacuum source (not shown). As illustrated in FIG. 5, slot 53 comprises two arcuate portions 53*a* and 53*b,* which extend between approximately the 11:00 o'clock and 6:00 o'clock positions of valve 52 and wheel 40. In accordance with the invention, arcuate portion 53*a* is open whereas arcuate portion 53*b* is closed, for example, by a vacuum blocking insert member. With this arrangement, as pick-up and deposit wheel 40 rotates in a counterclockwise direction, the gripping member head portions 43 thereof are connected to the vacuum source as they move downwardly from about the 11:00 o'clock position to about the 6:00 o'clock position and are disconnected from the vacuum source as they move upwardly from about the 6:00 o'clock position back to about the 11:00 o'clock position. The timing of the connecting and disconnecting of the vacuum source from gripping member head positions 43 may be modified by moving the location or changing the size of the vacuum blocking insert disposed in arcuate portion 53*b* in FIG. 5.

Figures 1, 9:
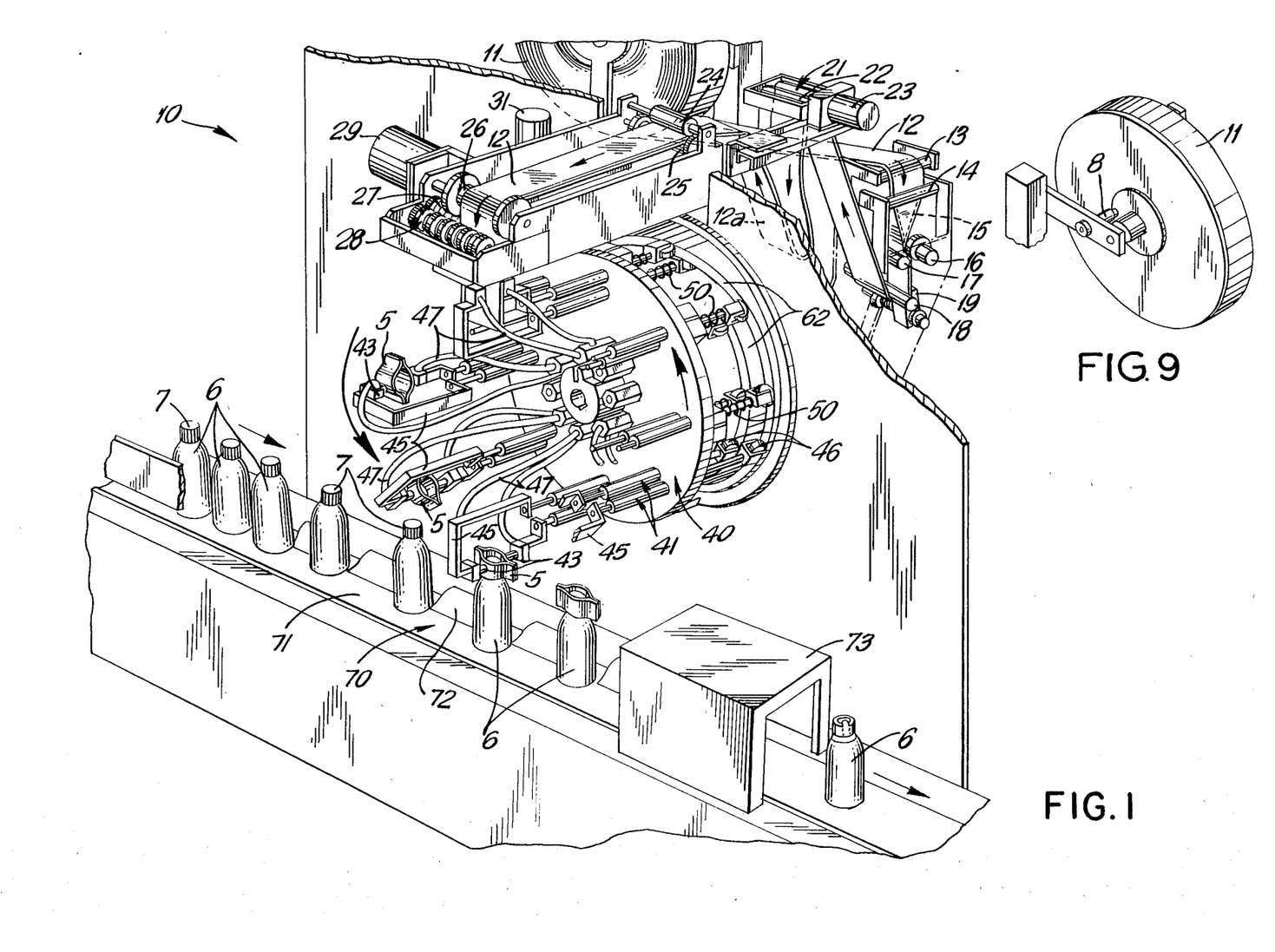
FIG. 1 is a perspective schematic view of the apparatus of the invention.
FIG. 9 is a schematic illustrating the braking mechanism for the supply roll of the invention.
Figure 6:
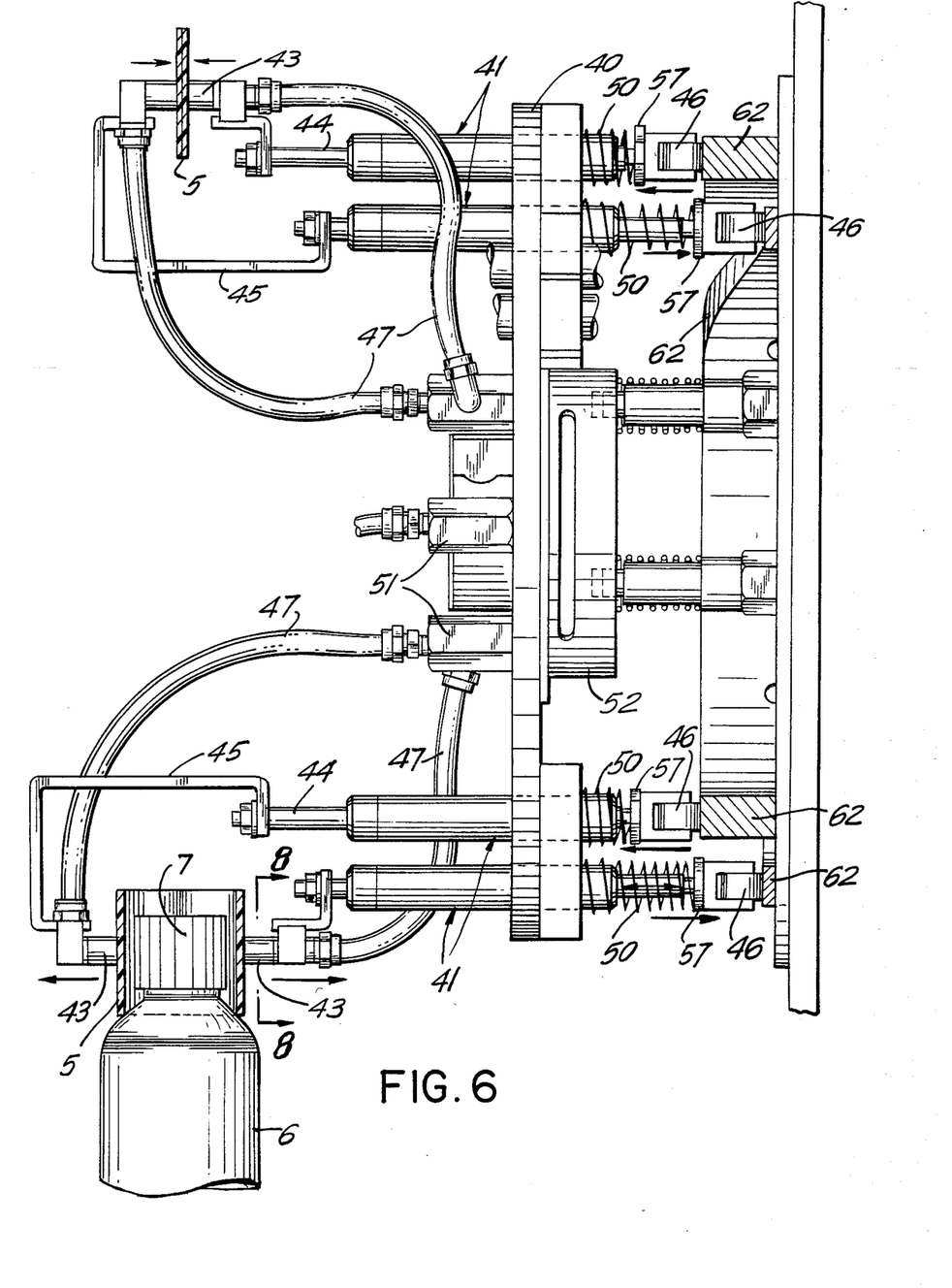
FIG. 6 is a side view of the pick-up and deposit wheel of the apparatus.

Referring to FIGS. 1, 5 and 6, the flattened tubular members 5 that are cut from web 12 by cutter 33 are mechanically picked up by a pair of gripping member head portions 43 as they reach approximately the 12:00 o'clock position of wheel 40. In addition, the movement of each pair of gripping members 41 towards the 12:00 o'clock position triggers the sequential operation of feed and cutter motors 29 and 31 described above.

Specifically, it is preferable that a scanner 30 be disposed in the vicinity of the 1:00 o'clock position of wheel 40. As each pair of gripping members 41 approaches cutter 33, scanner 30 detects such pair and transmits a signal to a control means (not shown) which first effects the operation of feed motor 29 so as to feed the precise amount of web material 12 to cutter 33. The control means then effects the operation of cutter motor 31 and attendant therewith cutter 33 which cuts a tubular member from web 12. In the meantime, the approaching pair of gripping members head portions 43 reach the 12:00 o'clock position and mechanically grip the cut tubular member 5.

The cam action associated with circular cams 62 and cam followers 46 of gripping members 41 when the gripping members are at the 12:00 o'clock position causes the opposed head portions 43 of each pair to move together so as to contact the opposed flattened sidewall portions of a tubular member 5 and effect the mechanical gripping of the tubular member. At that point, such head portions 43 are disconnected from the vacuum source and grip the tubular members solely by means of mechanical friction.

As wheel 40 rotates in a counter-clockwise direction, gripping member head portions 43 carry each flattened tubular member 5 away from cutter 33 in a downward arcuate path, still gripping the tubular member 5 solely by means of mechanical friction. At a predetermined point, for example, around the 11:00 o'clock position, gripping member head portions 43 are connected to the vacuum source and are moved apart from one another by the action of cams 62 and cam followers 46 as wheel 40 continues to rotate. Because head portions 43 are now applying suction to the opposite outer faces of the flattened tubular member 5, they are able, as they move apart, to open up the tubular member prior to its application to a container 6. The opening of each tubular member 5 by gripping member head portions 43 is facilitated by the prior cross-folding and flattening of the web of tubular material by cross-folding member 15, roller 18 and flattening member 19 as described above.

The containers 6 to be sealed are conveyed by conveyor belt 71 and timing screw 72 to the application station which is associated with approximately the 7:00 o'clock to 6:00 o'clock positions of rotating wheel 40. The timing screw pitch is selected such that each container cap 7 advances into a partially opened tubular member 5 at about the 7:00 o'clock position. In accordance with the invention, conveyor 71 and screw 72 move each container 6 at a speed greater than the rotational speed of wheel 40 so that as each container cap 7 contacts a partially open band 5, the container cap 7 pulls on and fully opens by cam action the band 5 so that it may be accurately deposited around the container cap. In the preferred embodiment of the invention, a curved ski member 74 is fixedly disposed at the application station for contacting each tubular member 5 at about the 7:00 o'clock position, i.e. where the tubular member is first looped around a container cap 7, and smoothly forcing by a cam action the tubular member into its proper level position around the container neck.

As indicated above, at approximately the 6:00 o'clock position, the vacuum in gripping member head portions 43 is disconnected so that the tubular member 5 is released and rests loosely around the container cap. After application of a tubular member 5 to a container 6, the container is fed by conveyor 71 through a heat tunnel 73 which causes the tubular material 5 to shrink around and conform to the shape of the container cap and neck, thus sealing the container. In the meantime, the pair of gripping member head portions 43 which has released the tubular member 5 is moved upwardly by rotating wheel 40 back to the 12:00 o'clock position and the individual head portions 43 are again moved toward each other by the action of cam 62 and cam follower 46 to repeat the gripping, opening and release cycle.

While the preferred embodiment of the subject invention has been described and illustrated, it would be obvious that various changes and modifications can be made therein without departing from the spirit of the invention which should be limited only by the scope of the appended claims.

What is claimed is:

1. A apparatus for applying a tubular member over an article at an application station comprising:

means for supplying a continuous web of flattened tubular material;

means for selectively drawing a portion of said web so as to provide a slack reservoir of tubular material;

means for cutting an individual tubular member from the terminal portion of the web;

a pair of opposed gripping members movable between said supply means and said applications station along an arcuate path, wach of said gripping members being movable towards and away from each other;

means for moving said gripping members from said supply means to said application station and back;

scanning means disposed adjacent the supply means for detecting when said gripping members are approaching said supply means;

feed rollers for feeding a predetermined amount of the web from said reservoir to said cutting means;

means for rotating said feed rollers a predetermined distance corresponding to the amount of the web to be cut into an individual tubular member;
control means responsive to said scanning means for actuating said rotating means upon detecting that the gripping members are approaching the supply means;
control means responsive to the rotation of said feed rollers said predetermined distance for actuating said cutting means;
means responsive to the dissipation of the web from the reservior for selectively operating said drawing means for a predetermined period of time so as to recreate a new reservoir of web material;
means for moving said gripping members towards each other as they are moved towards said supply means such that said gripping members mechanically grip a tubular member from said supply means;
means for moving said gripping members away from each other as they are being moved to the application station;
means for selectively applying a vacuum to said gripping members after they have mechanically gripped the tubular member and as said gripping members are moved away from each other such that said tubular member is opened when it is adjacent to the application station;
conveyor means for conveying the article to the application station at a speed greater than that at which the gripping members are moved to the application station such that at the application station the article meets and is threaded into the opened tubular member and pulls the tubular member fully open around the article; and
means for selectively disconnecting the vacuum to the gripping members when they are at the application station such that the tubular member is released therefrom and can rest around the article.

2. An apparatus for applying a tubular member over an article at an application station comprising:
supply means for providing a supply of individual tubular members;
a pair of opposed gripping members for mechanically gripping the tubular member, said gripping members disposed on a rotatable wheel member disposed between said supply means and said application station such that the gripping members may be repeatedly conveyed in a circular path from the supply means to the application station and back to the supply means, each of said gripping members being movable towards and away from each other;
a pair of circular cam members of varying depth disposed adjacent said rotatable wheel members and a cam follower connted to each gripping member for moving said gripping members away from each other as they are being B moved to the application station, each cam follower being biased against one of said cam members such that as said wheel member rotates, each cam follower tracks the path of its respective cam member and affects the desired movement of said gripping members relative to one another;
means for selectively applying a vacuum to said gripping members after they have mechanically gripped the tubular member and as said gripping members are moved away from each other such that said tubular member is opened when it is adjacent to the application station;
conveyor means for conveying the article to the application station at a speed greater than that at which the gripping members are moved to the application station such that at the application station the article meets and is threaded into the opened tubular member and pulls the tubular member fully open around the article; and
means for selectively disconnecting the vacuum to the gripping members when they are at the application station such that the tubular member is released therefrom and can rest around the article.

3. An apparatus for applying a tubular member over an article at an application station comprising:
means for providing a continuous web of flattened tubular material;
means for cutting an individual tubular member from the terminal portion of the web;
a rotatable wheel member disposed between said cutting means and the application station, said wheel member including at least one pair of opposed gripping members which are movable to and away from each other, the rotation of said wheel member effecting the movement of said gripping members along a circular path from said cutting means to the application station and back;
scanning means disposed adjacent the cutting means for detecting when said gripping members are approaching said cutting means;
feed rollers for feeding a predetermined amount of the web to said cutting means;
means for rotating said feed rollers a predetermined distance corresponding to the amount of the web to be cut;
control means responsive to said scanning means for actuating said rotating means upon detecting that the gripping members are approaching the cutting means;
control means responsive to the rotation of said feed rollers said predetermined distance for actuating said cutting means;
means for moving said gripping members towards each other as the rotation of said wheel member causes said gripping members to approach said cutting means such that said gripping members contact opposed faces of the tubular member cut by said cutting means and mechanically grip said tubular member;
means for moving said gripping members away from each other as the rotation of said wheel causes said gripping members to move away from said cutting means and toward the application station;
means for selectively applying a vacuum to said gripping members after they have mechanically gripped the tubular member and as said gripping members are moved away from each other and toward the application station such that said tubular member is opened as it is conveyed by the gripping members to the application station;
conveyor means for conveying the article to the application station at a speed greater than that at which the gripping members are moved to the application station such that at the application station the article meets and is threaded into the opened tubular member and pulls the tubular member fully open around the article; and means for selectively disconnecting the vacuum from the gripping members when they are at the application station such that the tubular member is released therefrom and can rest around the article.

4. An apparatus as in claim 3 which further comprises:
   means for selectively drawing a portion of the web so as to provide a slack reservoir of tubular material for feeding to the cutting means; and
   means responsive to the dissipation of the web from the reservoir for selectively operating said drawing means for a predetermined period of time so as to create a new reservoir of such material.

5. An apparatus for applying a tubular member over an article at an application station comprising:
   means for providing a continuous web of flattened tubular material;
   means for cutting an individual tubular member from the terminal portion of the web;
   means for feeding a predetermined amount of the web to said cutting means;
   a rotatable wheel member disposed between said cutting means and the application station, said wheel member including at least one pair of opposed gripping members which are movable to and away from each other, the rotation of said wheel member effecting the movement of said gripping members along a circular path from said cutting means to the application station and back;
   a pair of circular cam members of varying depth disposed adjacent said rotatable wheel member and a cam follower connected to each gripping member for moving said gripping members towards each other as the rotation of said wheel member causes said gripping members to approach said cutting means such that said gripping members contact opposed faces of the tubular member cut by said cutting means and mechanically grip said tubular member and for moving said gripping members away from each other as the rotation of said wheel member causes said gripping members to move away from said cutting means and toward the application station, each cam follower being biased against one of said cam members such that as said wheel member rotates, each cam follower tracks the path of its respective cam member and effects the desired movement of said gripping members relative to one another;
means for selectively applying a vacuum to said gripping members after they have mechanically gripped the tubular member and as said gripping members are moved away from each other and toward the application station such that said tubular members is opened as it is conveyed by the gripping members to the application station;
conveyor means for conveying the article to the application station at a speed greater than that at which the gripping members are moved to the application station such that at the application station the article meets and is threaded into the opened tubular members and pulls the tubular member fully open around the article; and
means for selectively disconnecting the vacuum from the gripping members when they are at the application station such that the tubular member is released therefrom and can rest around the article.

* * * * *